US012202735B2

(12) United States Patent
Bhushan et al.

(10) Patent No.: US 12,202,735 B2
(45) Date of Patent: Jan. 21, 2025

(54) PROCESS FOR PREPARING CHEMICALLY MODIFIED BICARBONATE SALT PARTICLES

(71) Applicant: Steerlife India Private Limited, Bengaluru (IN)

(72) Inventors: Indu Bhushan, Bengaluru (IN); Vinay Rao, Bengaluru (IN); Rakshith Shetty, Bengaluru (IN)

(73) Assignee: Steerlife India Private Limited, Bengaluru (IN)

( * ) Notice: Subject to any disclaimer, the term of this patent is extended or adjusted under 35 U.S.C. 154(b) by 415 days.

(21) Appl. No.: 17/805,836

(22) Filed: Jun. 7, 2022

(65) Prior Publication Data

US 2022/0298020 A1    Sep. 22, 2022

Related U.S. Application Data

(63) Continuation of application No. 17/416,244, filed as application No. PCT/IB2019/061180 on Dec. 20, 2019, now Pat. No. 11,383,986.

(30) Foreign Application Priority Data

Dec. 20, 2018   (IN) .............................. 201841048298

(51) Int. Cl.
*C01D 7/12*       (2006.01)
*B01J 6/00*       (2006.01)

(52) U.S. Cl.
CPC ................ *C01D 7/12* (2013.01); *B01J 6/004* (2013.01)

(58) Field of Classification Search
CPC ................................. C01D 7/12; C01D 7/123
See application file for complete search history.

(56) References Cited

U.S. PATENT DOCUMENTS

| | | | |
|---|---|---|---|
| 3,188,170 | A | 6/1965 | Mantz et al. |
| 3,482,934 | A | 12/1969 | Di Bello et al. |
| 5,217,719 | A | 6/1993 | Yorozu et al. |
| 5,997,836 | A | 12/1999 | Sato et al. |
| 6,506,871 | B1 | 1/2003 | Silvi et al. |

FOREIGN PATENT DOCUMENTS

| | | | | |
|---|---|---|---|---|
| WO | WO-2014104546 A1 | * | 7/2014 | ......... A61K 31/5365 |
| WO | WO 2017/178623 A1 | | 10/2017 | |

OTHER PUBLICATIONS

Samapundo, S., et al. "Interaction of water activity and bicarbonate salts in the inhibition of growth and mycotoxin production by *Fusarium* and *Aspergillus* species of importance to corn." International journal of food microbiology 116.2 (2007): 266-274.*

(Continued)

*Primary Examiner* — Richard M Rump
(74) *Attorney, Agent, or Firm* — Knobbe, Martens, Olson & Bear LLP

(57) ABSTRACT

The present disclosure relates to a method for chemically modifying particles of a bicarbonate salt in a co-rotating twin-screw extruder and chemically modified bicarbonate particles prepared therefrom. The present disclosure also relates to a method for controlling an amount of carbonate salt formed during chemical modification of bicarbonate salt particles.

10 Claims, 1 Drawing Sheet

Scanning electron micrograph of commercially available Surface Modified Sodium Bicarbonate

(56) References Cited

OTHER PUBLICATIONS

Davis, L. E., et al. "The Culturable Microbial Community from the Hot Springs of an African Soda Lake." Astrobiology Science Conference 2010: Evolution and Life: Surviving Catastrophes and Extremes on Earth and Beyond. vol. 1538. 2010.*

PCT Written Opinion of the International Searching Authority and International Search Report dated Jun. 11, 2020 for International Application No. PCT/IB19/61180.

* cited by examiner

Figure 1A Scanning electron micrograph of Chemically Modified Sodium Bicarbonate of Example 2
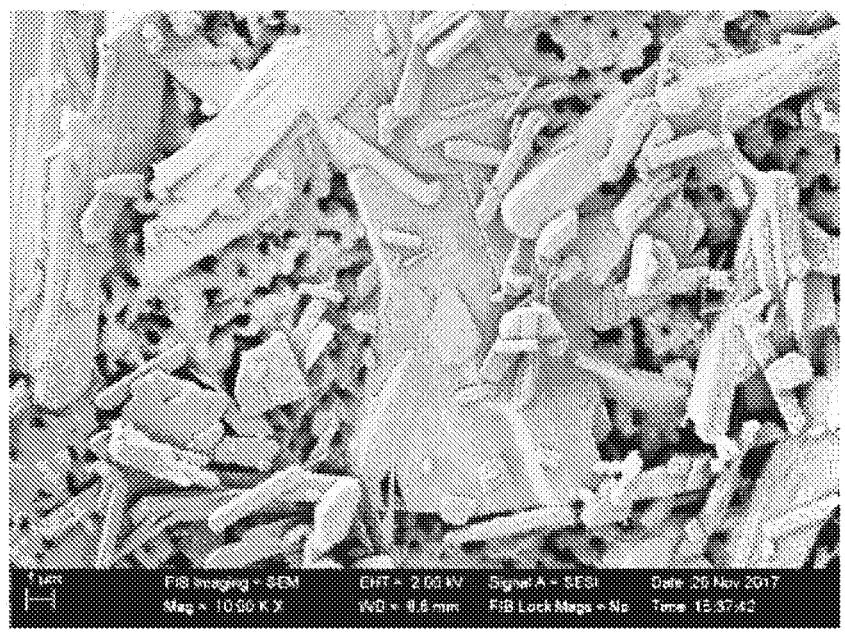
Figure 1B Scanning electron micrograph of commercially available Surface Modified Sodium Bicarbonate

PROCESS FOR PREPARING CHEMICALLY MODIFIED BICARBONATE SALT PARTICLES

RELATED CASES

This application is a continuation of co-pending U.S. patent application Ser. No. 17/416,244, filed Jun. 18, 2021, which is the United States National Phase application, made pursuant to 35 U.S.C. 371, of International Patent Application No. PCT/IB2019/061180, filed Dec. 20, 2019, which claims priority to Indian Patent Application No. 201841048298, filed Dec. 20, 2018, the entirety of each of which is incorporated by reference herein.

FIELD OF THE INVENTION

The present disclosure relates to a process of preparing chemically modified bicarbonate particles in a twin-screw extruder and chemically modified bicarbonate particles prepared therefrom.

BACKGROUND OF THE INVENTION

Bicarbonate salts are widely used in many products across food, pharmaceutical, nutraceutical industries. Most popular are alkali metal bicarbonates. Many different processes for commercial production of bicarbonate salts exist. Bicarbonates are reactive ingredients and are a source of carbon dioxide.

When sodium bicarbonate particles are heated above about 80° C., they undergo thermal decomposition, to form sodium carbonate, water, and carbon dioxide.

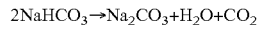

$$2NaHCO_3 \rightarrow Na_2CO_3 + H_2O + CO_2$$

The sodium carbonate acts as a desiccant layer on the sodium bicarbonate particles. It increases the resistance of the sodium bicarbonate to humidity. Heating sodium bicarbonate, to convert it partially into sodium carbonate by conventional methods such as—Heating in trays or Fluidized-bed heating to prepare surface-modified sodium bicarbonate or passivated sodium bicarbonate are known. The conventional methods are time-consuming or costly, batch processes.

In the above batch processes, removal of the water generated due to decomposition of sodium bicarbonate and the formation of sodium carbonate is tedious. There is inconsistency in the percentage of sodium bicarbonate converted to carbonate. Sodium carbonate acts as a desiccant and also passivates the reactive sodium bicarbonate. The variation in the content of sodium carbonate leads to variation in the degree of passivation. The reported literature suggests no efficient manufacturing lean process for passivating the bicarbonate salts in an extruder that can control the degree of passivation without too many operational parameters to consider. It would be desirable to prepare modified bicarbonate salts by a simpler and cost-effective, commercially viable, quick process suitable for continuous manufacturing.

SUMMARY OF THE INVENTION

The present disclosure relates to a method for chemically modifying particles of a bicarbonate salt in a co-rotating twin-screw extruder. The method comprises feeding the particles into an intake zone of the extruder; processing the fed particles in a heat treatment zone of the extruder at a temperature in the range of 200° C. to 350° C. for a residence time in the range 3 to 20 seconds to convert 3% to 40% w/w of the bicarbonate salt present in the fed particles into a carbonate salt, thereby chemically modifying the particles and collecting the chemically modified particles from the extruder.

The present disclosure also relates to chemically modified bicarbonate salt particles. The particles comprise a bicarbonate salt and a carbonate salt. A pH of 5% aqueous solution of the particles is in the range of 9.25 to 9.6, and water activity in the range of 0.05-0.3 $a_w$.

The present disclosure further relates to chemically modified bicarbonate salt particles. The particles comprise of a bicarbonate salt and a carbonate salt. A pH of 5% aqueous solution of the particles has a standard deviation of not more than 0.1. The standard deviation is calculated by measuring the pH of at least 10 different samples of the chemically modified particles.

The present disclosure also relates to a method for controlling an amount of carbonate salt formed during chemical modification of bicarbonate salt particles. The method comprises feeding the particles of bicarbonate salt into an intake zone of the extruder, processing the fed particles in a heat-treatment zone of the extruder for a residence time in the range 5 to 20 seconds to convert 3% to 40% w/w of the bicarbonate salt present in the fed particles into a carbonate salt, thereby chemically modifying the particles, and collecting the chemically modified particles from the extruder. The amount of the bicarbonate salt converted into the carbonate salt is controlled by maintaining temperature of the heat-treatment zone in the range of 200° C. to 350° C.

BRIEF DESCRIPTION OF THE DRAWINGS

FIG. 1A illustrates a scanning electron micrograph of chemically modified sodium bicarbonate of Example 2.

FIG. 1B illustrates a scanning electron micrograph of commercially available surface-modified sodium bicarbonate.

DETAILED DESCRIPTION OF THE PREFERRED EMBODIMENT

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "one embodiment", "an embodiment" or similar language means that a particular feature, structure, or characteristic described in connection with the embodiment is included in at least one embodiment of the present disclosure. Thus, appearances of the phrase "in one embodiment", "in an embodiment," and similar language throughout this specification may, but do not necessarily, all refer to the same embodiment.

The present disclosure relates to a method for chemically modifying particles of a bicarbonate salt in a co-rotating twin-screw extruder. The method comprises feeding the particles into an intake zone of the extruder, processing the fed particles in a heat-treatment zone of the extruder at a temperature in the range of 200° C. to 350° C. for a residence time in the range of 3 to 20 seconds to convert 3% to 40% w/w of the bicarbonate salt present in the fed particles into a carbonate salt, thereby chemically modifying the particles, and collecting the chemically modified particles from the extruder.

In the disclosed method amount of the bicarbonate salt converted into the carbonate, salt can be controlled by maintaining temperature of the heat-treatment zone in the range of 200° C. to 350° C. In accordance with an embodiment, the heat treatment zone is maintained at a temperature in the range of 200° C. to 300° C.

In accordance with an embodiment, 11-14% w/w of the bicarbonate salt is converted into the carbonate salt by maintaining the temperature of the heat-treatment zone at 200° C. In another embodiment, 15-19% w/w of the bicarbonate salt is converted into the carbonate salt by maintaining the temperature of the heat-treatment zone at 225° C. In yet another embodiment, 26-29% w/w of the bicarbonate salt is converted into the carbonate salt by maintaining the temperature of the heat-treatment zone at 275° C. In another embodiment, 35-39% w/w of the bicarbonate salt is converted into the carbonate salt by maintaining the temperature of the heat-treatment zone at 300° C.

The bicarbonate salt is a salt that undergoes a reversible reaction to form carbonate, water, and carbon dioxide. Examples of the bicarbonate salts suitable for the method include but are not limited to carbonate-containing compounds, such as potassium bicarbonate, sodium bicarbonate, and calcium bicarbonate and or a mixture thereof. In accordance with an embodiment, the bicarbonate salt is sodium bicarbonate. In another embodiment, the bicarbonate salt is potassium bicarbonate.

In accordance with an embodiment, the particles are fed into the intake zone of the extruder at a feed rate in the range of 100 g/min to 700 g/min. In an embodiment, the feed rate is in the range of 300 g/min to 600 g/min. In another embodiment, the feed rate is in the range of 400 g/min to 600 g/min.

In accordance with an embodiment, the size of the particle fed into the intake zone is less than or equal to 400 microns. In another embodiment, the size is less than or equal to 250 microns.

In accordance with an embodiment, the residence time is in the range of 8 to 20 seconds. In accordance with a specific embodiment, the residence time is in the range of 5 to 20 seconds.

In accordance with an embodiment, 10% to 40% w/w of the bicarbonate salt is converted into the carbonate salt. In another embodiment, 15% to 30% w/w of the bicarbonate salt is converted into the carbonate salt. The modification occurs mostly on the surface of the particles.

In accordance with an embodiment, a pH of a 5% aqueous solution of the chemically modified bicarbonate particles collected from the extruder is in the range of 8.6 to 9.6. In accordance with an embodiment, the pH is in the range of 9.2 to 9.4. The pH is measured at regular intervals. In accordance with an embodiment, the pH is calculated at intervals of 10 mins and 30 mins.

In accordance with an embodiment, a standard deviation in the pH of a 5% aqueous solution of the chemically modified bicarbonate particles is not more than 0.1. The standard deviation is measured by measuring the pH of at least 10 different samples of the chemically modified particles.

In accordance with an embodiment, a relative standard deviation in the pH of a 5% aqueous solution of the chemically modified bicarbonate particles collected at regular time intervals is less than 1%. In accordance with an embodiment, the pH is calculated at intervals of 10 mins and 30 mins.

In accordance with an embodiment, at a constant temperature selected from the range of 200° C. to 350° C., the chemically modified particles have uniform pH such that, a relative standard deviation of the pH values of 5% aqueous solutions of equal aliquots or samples of the chemically modified particles at regular time intervals is less than 1%. In accordance with an embodiment, the pH is calculated at intervals of 10 mins and 30 mins.

In accordance with an embodiment, only the heat treatment zone is heated. The length of the intake zone and the heat treatment zone is fixed according to the selected temperature. In accordance with an embodiment, the extruder has an additional conveying zone. In accordance with an embodiment, the intake zone and/or the conveying zone are not heated. In accordance with an embodiment, the intake zone and/or the conveying zone are maintained at room temperature.

The extruder comprises one or more screw elements. In accordance with an embodiment, the extruder comprises a plurality of screw elements. In a specific embodiment, the extruder contains only forward conveying screw elements. In accordance with an embodiment, screw speed is in the range of 300 to 600 rpm.

The extruder is provided with means for controlling the temperature of the intake zone, heat treatment zone and conveying zone (if present). It is also provided with the means for adjustment of screw speed. It further has a human-machine interface to control the processing conditions.

The intake zone can be connected upstream to a side feeder, which in turn, can be connected upstream to a hopper. Alternatively, the intake zone may be connected directly to the hopper.

A collecting vessel may be connected to the exit end of the extruder for the collection of the chemically modified particles. In another example, the collecting vessel may be connected to a diverter valve, which in turn can be connected, upstream to the exit end of the extruder and downstream to the collecting vessel. In another example, a spiral conveyor is provided to collect and convey the chemically modified particles from the extruder into a collection vessel or on to a tray.

The particles being fed and processed, and gaseous by-products should be displaced or metered towards the exit of the extruder without any backflow or stagnation. This may be achieved by using one or more side feeder(s) placed perpendicularly or at any other angle to the intake zone such that it creates an airlock and prevent the backflow of steam and/or gaseous by-products formed during the processing of the particles. Also, the particles may be force-fed to create a positive displacement of the particles and by-products away from the intake zone.

Examples of suitable twin-screw extruders include but are not limited to the Omega series of extruders manufactured by STEER Engineering Private Limited.

The present disclosure also relates to chemically modified bicarbonate salt particles. The particles comprising a bicarbonate salt and a carbonate salt. A 5% aqueous solution of the chemically modified particles has pH in the range of 8.6 to 9.6. The particles have a water activity in the range of 0.05-0.3 $a_w$.

In accordance with an embodiment, the pH of the chemically modified particles is in the range of 9.2 to 9.6. In accordance with an embodiment, the pH of the chemically modified particles is in the range of 9.25 to 9.6

The bicarbonate salt is a salt that undergoes a reversible reaction to form carbonate, water, and carbon dioxide. Examples of the bicarbonate salts suitable for the method include but are not limited to carbonate-containing compounds, such as potassium bicarbonate, sodium bicarbonate, and calcium bicarbonate, and or a mixture thereof. In accordance with an embodiment, the bicarbonate salt is sodium bicarbonate. In another embodiment, the bicarbonate salt is potassium bicarbonate.

The pH is measured at regular intervals. In accordance with an embodiment, the pH is measured at intervals of 10 mins and 30 mins.

In accordance with an embodiment, the particles have a water activity in the range of 0.05-0.3 $a_w$.

The present disclosure also relates to chemically modified bicarbonate salt particles comprising a bicarbonate salt and a carbonate salt, wherein a pH of 5% aqueous solution of the particles has a standard deviation of not more than 0.1. The standard deviation is calculated by measuring the pH of at least 10 different samples of the chemically modified particles.

In accordance with an embodiment, a relative standard deviation in the pH of a 5% aqueous solution of the chemically modified particles collected at regular intervals is less than 1%.

The chemically modified particles obtained from the process are dry, passivated, and free-flowing.

The chemically modified bicarbonate particles can be packed and stored in aluminum pouches of various capacities.

The invention is further illustrated by the following examples, which are provided to be exemplary of the invention, and do not limit the scope of the invention. While the present invention has been described in terms of its specific embodiments, certain modifications and equivalents will be apparent to those skilled in the art and are intended to be included within the scope of the present invention.

SPECIFIC EMBODIMENTS OF THE INVENTION

A method for chemically modifying particles of a bicarbonate salt in a co-rotating twin-screw extruder is disclosed. The method comprises of feeding the particles into an intake zone of the extruder; processing the fed particles in a heat-treatment zone of the extruder at a temperature in the range of 200° C. to 350° C. for a residence time in the range 3 to 20 seconds to convert 3% to 40% w/w of the bicarbonate salt present in the fed particles into a carbonate salt, thereby chemically modifying the particles; and collecting the chemically modified particles from the extruder.

Such method is disclosed, wherein a pH of a 5% aqueous solution of the collected particles in the range of 8.6 to 9.6.

Such method is disclosed, wherein at a constant temperature selected from the range of 200° C. to 350° C., the method provides the chemically modified particles having uniform pH such that, a relative standard deviation of the pH values of 5% aqueous solutions of equal aliquots of the particles collected from the extruder at regular time intervals is less than 1%.

Such method is disclosed, wherein the collected particles has water activity in the range of 0.05-0.3 $a_w$.

Such method is disclosed, wherein the bicarbonate salt is selected from the group consisting of sodium bicarbonate and potassium bicarbonate.

Such method is disclosed, wherein the method provides conversion of 10% to 40% w/w of the bicarbonate salt into the carbonate salt.

Such method is disclosed, wherein the method provides conversion of 15% to 30% w/w of the bicarbonate salt into the carbonate salt.

Such method is disclosed, wherein the particles of bicarbonate salt are fed into the intake zone at a feed rate in the range of 100 g/min to 700 g/min.

Chemically modified bicarbonate salt particles are disclosed. The chemically modified bicarbonate salt particles comprise a bicarbonate salt and a carbonate salt, wherein 5% aqueous solution of the particles has pH in the range of 9.25 to 9.6, and water activity in the range of 0.05-0.3 $a_w$.

Chemically modified bicarbonate salt particles are disclosed. The chemically modified bicarbonate salt particles comprises a bicarbonate salt and a carbonate salt, wherein pH of 5% aqueous solution of the particles has standard deviation of not more than 0.1; wherein the standard deviation is calculated by measuring the pH of at least 10 equal aliquots of the chemically modified bicarbonate salt particles.

A method for controlling an amount of carbonate salt formed during chemical modification of bicarbonate salt particles is disclosed. The method comprises of feeding the particles of bicarbonate salt into an intake zone of the extruder, processing the fed particles in a heat-treatment zone of the extruder for a residence time in the range 3 to 20 seconds to convert 3% to 40% w/w of the bicarbonate salt present in the fed particles into a carbonate salt, thereby chemically modifying the particles, and collecting the chemically modified particles from the extruder, wherein the amount of the bicarbonate salt converted into the carbonate salt is controlled by varying temperature of the heat-treatment zone in the range of 200° C. to 350° C.

Such method is disclosed, wherein 11-14% w/w of the bicarbonate salt is converted into the carbonate salt by maintaining the temperature of the heat-treatment zone at 200° C.

Such method is disclosed, wherein 15-19% w/w of the bicarbonate salt is converted into the carbonate salt by maintaining the temperature of the heat-treatment zone at 225° C.

Such method is disclosed, wherein 26-29% w/w of the bicarbonate salt is converted into the carbonate salt by maintaining the temperature of the heat-treatment zone at 275° C.

Such method is disclosed, wherein, wherein 35-39% w/w of the bicarbonate salt is converted into the carbonate salt by maintaining the temperature of the heat-treatment zone at 300° C.

EXAMPLES

Example 1: Preparation of Chemically Modified Sodium Bicarbonate Particles

Sodium bicarbonate particles were fed by a volumetric top feeder into the intake zone of a co-rotating twin-screw extruder.

Extruder used: Omega 20 P by STEER Engineering Private Limited

Length of the intake zone=200 mm

Length of the heat treatment zone=1 m

The extruder had a forward conveying screw configuration to avoid the back movement of the bicarbonate particles towards the feeder. The screw configuration of the extruder is provided in Table 1A below.

TABLE 1A

Screw configuration

| | Elements* | | | | | | | | | |
|---|---|---|---|---|---|---|---|---|---|---|
| | RSE (CHS) 15/15 | NRF 40/20 | RFV- 45/40 | RFN- 40/20 | RSE- 30/15 | RSE- 20/20 | RSE- 15/30 | RSE- 15/15 | RSE- 10/10 | RSE- 20/60 |
| No of Screw Elements | 1 | 1 | 3 | 1 | 1 | 22 | 6 | 17 | 10 | 1 |

*Elements used:
RSE: 3Lobe Right hand Screw Element (3RSE)
NRF: Normal to RSE transition element
RFV: Regular flight shovel element
RFN: RFV to normal screw element
CHS: Chamfer and step The intake zone was maintained at approximately 30° C. The heat treatment zone was maintained at 200° C. The screw speed and feed rate were varied for different trials A to H. The chemically modified particles exiting the extruder were collected in trays, cooled, and packed. The effect of changing the feed rate and the screw speed on the characteristics of the chemically modified sodium bicarbonate particles was studied and the results provided in Table 1B below:

TABLE 1B

The effect of changing the feed rate and the screw speed

| Trial | Feed Rate | Screw speed (RPM) | pH of 5 g sample dissolved in 200 ml of de-ionized water at room temperature |
|---|---|---|---|
| A | 400 g/min | 300 | 9.19 |
| B | 400 g/min | 600 | 9.08 |
| C | 200 g/min | 300 | 9.21 |
| D | 200 g/min | 600 | 9.09 |
| E | 100 g/min | 300 | 9.17 |
| F | 100 g/min | 600 | 9.28 |

TABLE 1B-continued

The effect of changing the feed rate and the screw speed

| Trial | Feed Rate | Screw speed (RPM) | pH of 5 g sample dissolved in 200 ml of de-ionized water at room temperature |
|---|---|---|---|
| G | 600 g/min | 300 | 9.1 |
| H | 600 g/min | 600 | 8.98 |

The pH was measured by Thermo Scientific pH meter. The pH of sodium bicarbonate before feeding into the extruder was 8.24

Example 2: Preparation of Chemically Modified Sodium Bicarbonate Particles

Sodium bicarbonate particles were fed by a volumetric top feeder into the intake zone of a co-rotating twin-screw extruder.

Extruder used: Omega 20 P by STEER Engineering Private Limited

Length of the intake zone=200 mm

Length of the heat treatment zone=1 m

The extruder had a forward conveying screw configuration to avoid the reverse movement of any bicarbonate towards the feeder. The screw configuration of the extruder is provided in Table 2A below.

TABLE 2A

Screw configuration

| | Elements | | | | | | | | | |
|---|---|---|---|---|---|---|---|---|---|---|
| | RSE 15/15 (CHS) | NRF 40/20 | RFV- 45/40 | RFN- 40/20 | RSE- 30/15 | RSE- 20/20 | RSE- 15/30 | RSE- 15/15 | RSE- 10/10 | RSE- 20/60 |
| No. of Screw Elements | 1 | 1 | 3 | 1 | 1 | 22 | 6 | 17 | 10 | 1 |

The intake zone was maintained at approximately 30° C. The heat treatment zone was maintained at 200° C. The screw speed was set at 500 rpm and the feed rate was maintained at approximately 620 g/minute. The chemically modified particles exiting the extruder were collected in trays, cooled, and packed.

The chemically modified particles were studied to determine their consistency over a one-hour run. The samples of the chemically modified particles were collected at the exit of the extruder at time intervals of 5 minutes. A solution of 5 g of each sample in 200 ml of deionized water at room temperature was prepared and the pH values were determined. The results are provided in Table 2B below.

TABLE 2B

The pH of the chemically modified particles

| Time interval (minutes) | pH |
| --- | --- |
| 5 | 8.91 |
| 10 | 8.87 |
| 15 | 8.9 |
| 20 | 8.91 |
| 25 | 8.85 |
| 30 | 8.93 |
| 35 | 8.98 |
| 40 | 8.92 |
| 45 | 9.02 |
| 50 | 8.98 |
| 55 | 8.96 |
| 60 | 8.97 |
| Average pH | 8.93 |
| Standard Deviation (SD) | 0.05 |
| Relative Standard Deviation (RSD) | 0.56 |

The pH was measured by Thermo Scientific pH meter

Observation: Throughout the process, the pH of the samples remained constant, with a relative standard deviation (RSD) of 0.56%, indicating the consistency of the chemically modified particles obtained by the process.

A Scanning Electron Micrograph (SEM) of this product ((FIG. 1A) was compared with a SEM of commercially available chemically modified sodium bicarbonate particles (FIG. 1B). The SEMs show that surface modification of the chemically modified particles obtained by the disclosed process is significantly continuous, as compared to that of the commercially available chemically modified sodium bicarbonate particles Example 3: Preparation of Chemically Modified Sodium Bicarbonate Particles Sodium bicarbonate particles were fed by a volumetric top feeder into the intake zone of a co-rotating twin-screw extruder.

Extruder used: Omega 20 P by STEER Engineering Private Limited

Length of the intake zone=200 mm

Length of the heat treatment zone=1 m

The extruder had a forward conveying screw configuration to avoid the reverse movement of any bicarbonate towards the feeder. The screw configuration of the extruder is provided in Table 1A below.

TABLE 3A

| | Screw Configuration | | | | | | | |
| --- | --- | --- | --- | --- | --- | --- | --- | --- |
| | Elements | | | | | | | |
| | 3 RSE (CHS) 15/15 | SSV 40/40 | SSV-3RSE* 40/20 | 3RSE-30/60 | 3RSE-40/40 | 3RSE-30/60 | 3RSE-15/15 | 3RSE-15/30 |
| No. of Elements | 1 | 5 | 1 | 9 | 8 | 1 | 1 | 1 |

*SSV-3RSE: Special Shovel Element Transition Element (SSV-3RSE)
*SSV: Special Shovel Type Element The intake zone was maintained at approximately 30° C. The heat treatment zone was maintained at 220° C. About 250 kgs of sodium bicarbonate particles were fed into the extruder during the process. The screw speed was set at 500 rpm and the feed rate was maintained at 620 g/min. The chemically modified particles exiting the extruder were collected in trays, cooled, and packed.

The pH of the unprocessed sodium bicarbonate particles and the chemically modified particles was measured. The initial pH of 1% (w/v) solution of the unprocessed sodium bicarbonate particles was 8.40. The average pH of the 1% solution of 30 samples of the chemically modified particles collected every 10 minutes from the exit of the extruder is provided in Table 3B below.

TABLE 3B

The average pH of the 1% solution of 30 samples of the chemically modified particles

| Parameters | pH of 1% solution |
| --- | --- |
| Average (n = 30) | 9.42 |
| Standard Deviation | 0.07 |
| Relative standard Deviation (%) | 0.70 |

Water activity of the unprocessed sodium bicarbonate particles and the chemically modified particles obtained from the disclosed process was calculated and the values are provided in Table 3C below.

TABLE 3C

Water Activity

| | |
| --- | --- |
| Initial water activity ($a_w$ at 25 ± 2° C.) of unprocessed sodium bicarbonate particles | 0.455 |

TABLE 3C-continued

| Water Activity | |
|---|---|
| Average water activity ($a_w$ at 25 ± 2° C.) of samples of chemically modified sodium bicarbonate particles (n = 30) collected as mentioned above | 0.2447 |

Observations: Throughout the processing, the pH remained constant, with a relative standard deviation of 0.70%, indicating the consistency of the chemically modified particles obtained by the process over a long trial run.

Example 4: Preparation of Chemically Modified Sodium Bicarbonate Particles

Sodium bicarbonate particles were fed by a volumetric top feeder into the intake zone of a co-rotating twin-screw extruder.

Extruder used: Omega 20 P by STEER Engineering Private Limited
 Length of the intake zone=200 mm
 Length of the heat treatment zone=1 m The extruder had a forward conveying screw configuration to avoid the reverse movement of any bicarbonate towards the feeder. The screw configuration of the extruder is provided in Table 4A below.

TABLE 4

| Screw configuration | | | | | | |
|---|---|---|---|---|---|---|
| Elements | | | | | | |
| 3RSE (CHS) 15/15 | SSV 40/40 | SSV-3RSE 40/20 | 3RSE-40/40 | 3RSE-30/60 | 3RSE-15/30 | 3RSE-20/60 |
| No. of Elements | | | | | | |
| 1 | 5 | 1 | 8 | 10 | 1 | 1 |

The intake zone was maintained at approximately 30° C. The heat treatment zone was maintained at 220° C. About 250 kgs of sodium bicarbonate particles were fed into the extruder during the process. The screw speed was set at 500 rpm and the feed rate was maintained at 620 g/minute during the process. The chemically modified particles exiting the extruder was collected in trays, cooled, and packed.

The pH of the unprocessed sodium bicarbonate particles and the chemically modified particles was measured. The initial pH of the 1% solution of the unprocessed sodium bicarbonate particles was 8.38. The average pH of the 1% solution of 10 Samples of the chemically particles collected at 15-minute intervals from the exit of the extruder was 9.26 and the relative standard deviation was 0.39%.

Observations: Throughout the processing, the pH remained constant, with a relative standard deviation of 0.39%, indicating the consistency of the chemically modified particles obtained by the process over a long trial run.

Example 5: Preparation of Chemically Modified Sodium Bicarbonate Particles

Sodium bicarbonate particles were fed by a volumetric top feeder into the intake zone of a co-rotating twin-screw extruder through a side feeder positioned perpendicular to the extruder barrel.

Extruder used: Omega 20 P by STEER Engineering Private Limited
 Length of the intake zone=200 mm
 Length of the heat treatment zone=1 m The extruder had a forward conveying screw configuration to avoid the reverse movement of any bicarbonate towards the feeder. The screw configuration of the extruder is provided in Table 5A below.

TABLE 5

| Screw configuration | | | | | | |
|---|---|---|---|---|---|---|
| Elements | | | | | | |
| 3RSE (CHS) 15/15 | SSV 40/40 | SSV-3RSE 40/20 | 3RSE-20/60 | 3RSE-15/60 | 3RSE-15/30 | |
| No. of Elements | | | | | | |
| 1 | 5 | 1 | 8 | 7 | 4 | |

The intake zone was maintained at approximately 30° C. The heat treatment zone was maintained at 220° C. About 100 kgs of sodium bicarbonate particles were fed into the extruder during the process. The screw speed was set at 500 rpm and the feed rate was maintained at 36 kg/hr during the process. The chemically modified particles exiting the extruder was collected in trays, cooled, and packed.

The pH of the unprocessed sodium bicarbonate particles and the chemically modified particles was measured. The pH of the 5% solution of the unprocessed sodium bicarbonate particles was 8.03. The average pH of the 5% solution of 17 Samples of the chemically modified particles collected at 10-minute intervals from the exit of the extruder was 8.68 and the relative standard deviation was 0.6%.

Observations: Throughout the processing, the pH remained constant, with a relative standard deviation of 0.6%, indicating the consistency of the chemically modified particles obtained by the process over a long trial run.

The carbon dioxide content of the chemically modified bicarbonate particles was also measured. The difference in weight of the flask with 50 ml of 2 N sulfuric acid solution subtracted by the weight after the addition of sample (5 g of input sodium bicarbonate/5 g of processed sodium bicarbonate), gives the weight of retained carbon dioxide in the sodium bicarbonate after passivation process.

Observations: The relative retained carbon dioxide content of chemically modified particles sodium bicarbonate particles compared to unprocessed sodium bicarbonate particles was 96.88%.

Example 6: Preparation of Chemically Modified Potassium Bicarbonate Particles Potassium bicarbonate particles were fed by a volumetric top feeder through a side feeder connected perpendicularly to the extruder barrel, into the intake zone of a co-rotating twin-screw extruder at the rate of 37.2 kg/hr. The product exiting the extruder was passed on a downstream spiral conveyor and finally into a receiver.

Extruder used: Omega 20 P by STEER Engineering Private Limited
 Length of the intake zone=200 mm
 Length of the heat treatment zone=1 m The extruder had a forward conveying screw configuration to avoid the reverse movement of any bicarbonate towards the feeder. The screw configuration of the extruder is provided in Table 6 below.

TABLE 6

Screw configuration

| | Elements | | | | | |
|---|---|---|---|---|---|---|
| | 3RSE (CHS) 15/15 | SSV 40/40 | SSV-3RSE 40/20 | 3RSE-20/60 | 3RSE-15/60 | 3RSE-15/30 |
| No. of Elements | 1 | 5 | 1 | 8 | 7 | 4 |

The intake zone was maintained at approximately 30° C. The heat treatment zone was maintained at 350° C.

The pH and the water activity of the unprocessed potassium bicarbonate particles and the chemically modified particles were measured.

The pH of the 5% w/v solution of the unprocessed sodium bicarbonate particles was 8.34. The average pH of the 5% solution of 3 samples of the chemically modified particles collected from the exit of the extruder was 9.40.

The initial water activity of unprocessed potassium bicarbonate particles was: 0.462 $a_w$. The water activity of chemically modified potassium bicarbonate was particles: 0.057 $a_w$.

Observations: Throughout the processing, the pH remained constant indicating the consistency of the chemically modified particles obtained by the process over a long trial run.

Example 7: Effect of Change in the Temperature of the Heat Treatment Zone on the Carbonate Content of the Chemically Modified Sodium Bicarbonate Particles Sodium bicarbonate particles were fed into the intake zone of a co-rotating twin-screw extruder, at the rate of 36 kg/hr.

Extruder used: Omega 20 P by STEER Engineering Private Limited

Length of the intake zone=200 mm

Length of the heat treatment zone=1 m

The extruder had a forward conveying screw configuration to avoid the reverse movement of any bicarbonate towards the feeder. The screw configuration of the extruder is provided in Table 7A below.

TABLE 7A

Screw configuration

| | Elements | | | | | |
|---|---|---|---|---|---|---|
| | 3RSE (CHS) 15/15 | SSV 40/40 | SSV-3RSE 40/20 | 3RSE-20/60 | 3RSE-15/60 | 3RSE-15/30 |
| No. of Elements | 1 | 5 | 1 | 8 | 7 | 4 |

The intake zone was maintained at approximately 30° C. The heat treatment zone was maintained at different temperatures during different trials as provided in Table 7B. Each trial was run for approximately 30 minutes. The samples of chemically modified particles were collected at regular time intervals (0 min, 10 mins and 30 mins). The sodium carbonate content and the pH of the samples was determined.

Estimation of Sodium Carbonate in Sodium Bicarbonate Particles

Preparation of sample solution S 1: Transferred 2000 mg of sodium bicarbonate into 100 ml volumetric flask. Added 70 ml of diluent sonicate to the flask to dissolve the sodium bicarbonate and mixed well.

Estimation of sodium carbonate: Pipetted out 25 ml (V3) of S1 into a 100 ml conical flask. Added drops of phenolphthalein indicator and titrated immediately with 0.1 M HCL till the solution became colorless. An average of readings of 3 samples were taken. The sodium carbonate content mg was calculated using the formula below:

$$M3 = \frac{M2 \times VB \text{ (Burette reading)}}{V3}$$

Amount of sodium carbonate (mg) in sample solution=$M3 \times$ Molar mass of sodium carbonate g/mol×100 (Dilution of sample)

% sodium carbonate=Amount of sodium carbonate in mg×100 Sample weight in mg

M2: Molarity of 0.1 M HCl in mol/dm$^3$.

M3: Molarity of sodium carbonate in a sample solution in mol/dm$^3$

VB: Volume of 0.1 M HCl consumed for Half-neutralization of sodium carbonate in mL.

V3: Volume of the sample (SI) taken in ml.

TABLE 7B

Effect of the temperature of the heat treatment zone

| Trial | Temperature of the heat treatment zone (° C.) | Sample | Sodium carbonate content (%) | | | pH (5% aqueous solution) | | |
|---|---|---|---|---|---|---|---|---|
| | | | Prep-1 | Prep-2 | Mean | Prep-1 | Prep-2 | Mean |
| I | 200 | Input material | 7.29 | 7.50 | 7.40 | 8.38 | 8.27 | 8.33 |
| | | 10 minutes | 11.14 | 11.36 | 11.25 | 8.50 | 8.64 | 8.57 |
| | | 30 minutes | 12.77 | 13.38 | 13.07 | 8.69 | 8.66 | 8.68 |
| J | 225 | Input material | 7.30 | 8.12 | 7.71 | 8.29 | 8.30 | 8.30 |
| | | 10 minutes | 15.22 | 15.99 | 15.60 | 8.82 | 8.85 | 8.84 |
| | | 30 minutes | 18.67 | 18.62 | 18.65 | 8.85 | 8.88 | 8.87 |
| K | 275 | Input material | 7.30 | 8.12 | 7.71 | 8.30 | 8.22 | 8.26 |
| | | 10 minutes | 26.16 | 27.74 | 26.96 | 9.10 | 9.15 | 9.13 |
| | | 30 minutes | 28.59 | 28.78 | 28.68 | 9.17 | 9.17 | 9.17 |

TABLE 7B-continued

Effect of the temperature of the heat treatment zone

| Trial | Temperature of the heat treatment zone (° C.) | Sample | Sodium carbonate content (%) | | | pH (5% aqueous solution) | | |
|---|---|---|---|---|---|---|---|---|
| | | | Prep-1 | Prep-2 | Mean | Prep-1 | Prep-2 | Mean |
| L | 300 | Input material | 7.49 | 7.91 | 7.70 | 8.48 | 8.48 | 8.48 |
| | | 10 minutes | 38.30 | 38.54 | 38.42 | 9.42 | 9.41 | 9.42 |
| | | 30 minutes | 35.51 | 35.30 | 35.41 | 9.37 | 9.36 | 9.37 |

Observation: The amount of conversion of sodium bicarbonate into sodium carbonate can be controlled by varying the temperature of the heat treatment zone.

The present disclosure provides chemically modified bicarbonate particles and process for preparing the same. The particles are mostly modified on the surface.

The disclosed process efficiently delivers a consistent degree of chemical modification of the particles. The process is economical and does not require special controls for maintaining room temperature and/or humidity. The disclosed process allows continuous manufacturing of the chemically modified bicarbonate particles.

The chemically modified particles obtained from the process are dry, passivated, and free flowing. The amount of the corresponding carbonate formed is the particles is consistent throughout the run. The pH of the solutions of the particles exhibit standard deviation of less than 1%, which indicates that the particles obtained have been uniformly modified. Further, the particles obtained exhibit enhanced stability and shelf life.

What is claimed is:

1. A chemically modified bicarbonate salt particle compound comprising:
   a bicarbonate salt and a carbonate salt, wherein a 5% aqueous solution of the chemically modified bicarbonate salt particles has pH in the range of 9.25 to 9.6, and water activity ($a_w$) in the range of 0.05 to 0.3.

2. The chemically modified bicarbonate salt particle compound of claim 1, wherein the pH of 5% aqueous solution of the particles has standard deviation of not more than 0.1, wherein the standard deviation is calculated by measuring the pH of at least 10 equal aliquots of the chemically modified bicarbonate salt particles.

3. The chemically modified bicarbonate salt particle compound of claim 1, wherein the bicarbonate salt is selected from the group consisting of sodium bicarbonate, potassium bicarbonate, calcium bicarbonate and combinations thereof.

4. The chemically modified bicarbonate salt particle compound of claim 1, wherein the particle comprise about 3% to 40% (w/w) of the carbonate salt.

5. The chemically modified bicarbonate salt particle compound of claim 1, wherein the compound comprises about 11% to 14% (w/w) of the carbonate salt.

6. The chemically modified bicarbonate salt particle compound of claim 1, wherein the compound comprises about 15% to 19% (w/w) of the carbonate salt.

7. The chemically modified bicarbonate salt particle compound of claim 1, wherein the compound comprises about 26% to 29% (w/w) of the carbonate salt.

8. The chemically modified bicarbonate salt particle compound of claim 1, wherein the compound comprises about 35% to 39% (w/w) of the carbonate salt.

9. The chemically modified bicarbonate salt particle compound of claim 1, wherein the chemically modified bicarbonate salt particle compound are obtained by processing bicarbonate salt particles in a co-rotating twin-screw extruder by a method comprising:
   feeding the bicarbonate salt particles into an intake zone of the extruder;
   processing the fed particles in a heat-treatment zone of the extruder at a temperature in the range of 200° C. to 350° C. for a residence time in the range 3 to 20 seconds to convert 3% to 40% w/w of the bicarbonate salt present in the fed particles into a carbonate salt, thereby obtaining the chemically modified bicarbonate salt particles; and
   collecting the chemically modified bicarbonate salt particles from the extruder.

10. The chemically modified bicarbonate salt particle compound of claim 9, wherein 10% to 40% w/w of the bicarbonate salt is converted into the carbonate salt.

* * * * *